Aug. 10, 1954  A. RABAL  2,686,034
PILOT CONTROLLED DIAPHRAGM VALVE
Filed Oct. 28, 1948  2 Sheets-Sheet 1

Alfredo Rabal

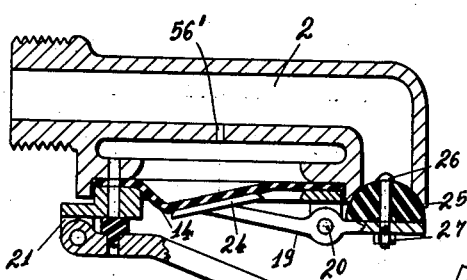
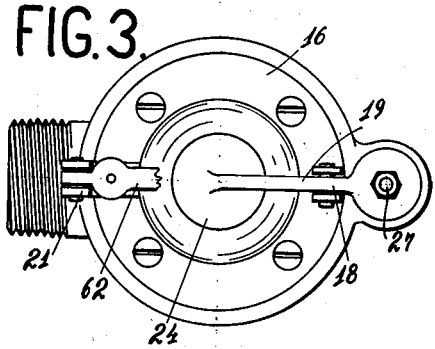
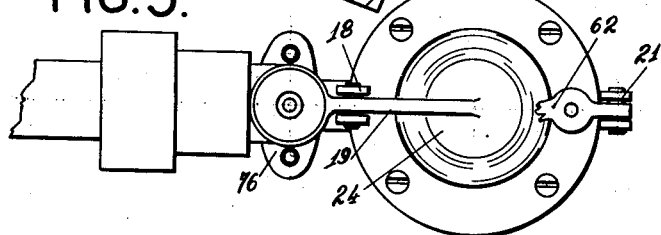
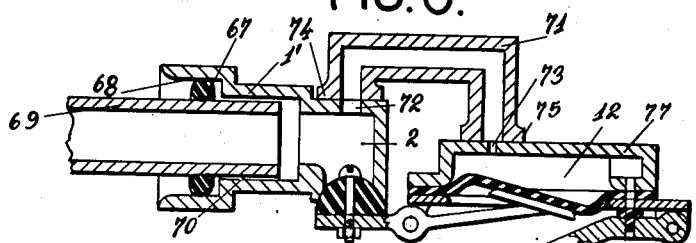
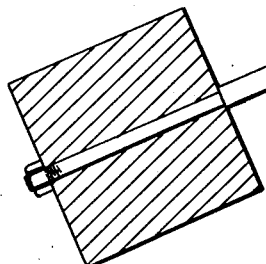

Patented Aug. 10, 1954

2,686,034

UNITED STATES PATENT OFFICE 2,686,034

PILOT CONTROLLED DIAPHRAGM VALVE

Alfredo Rabal, Junin, Buenos Aires, Argentina

Application October 28, 1948, Serial No. 56,969

3 Claims. (Cl. 251—46)

The present invention relates to an automatic by-pass valve intended to improve the mode of supplying liquid for the different uses of usual taps or faucets for which a float is needed to keep water at average level, such as tanks, water-troughs, water-closet containers, etc.

This valve is intended to overcome present disadvantages in water supply, thus saving useless expense and ensuring efficient operation, with the advantage that it can be operated at some distance by foot, leg or hand, just by slightly pressing a button. Owing to its structure the "water hammer" has been completely eliminated.

In order that this invention be clearly understood and to show the way it operates, in the accompanying drawings the different parts have reference numbers.

Fig. 3 shows a plan view of a modified form of the valve to be operated by means of a float.

Fig. 4 is a longitudinal sectional view of the structure of Fig. 3.

Fig. 5 is a plan view of a more economical structural design for use in water troughs operated by means of a float.

Fig. 6 is a longitudinal sectional view of Fig. 5.

Figure 1:
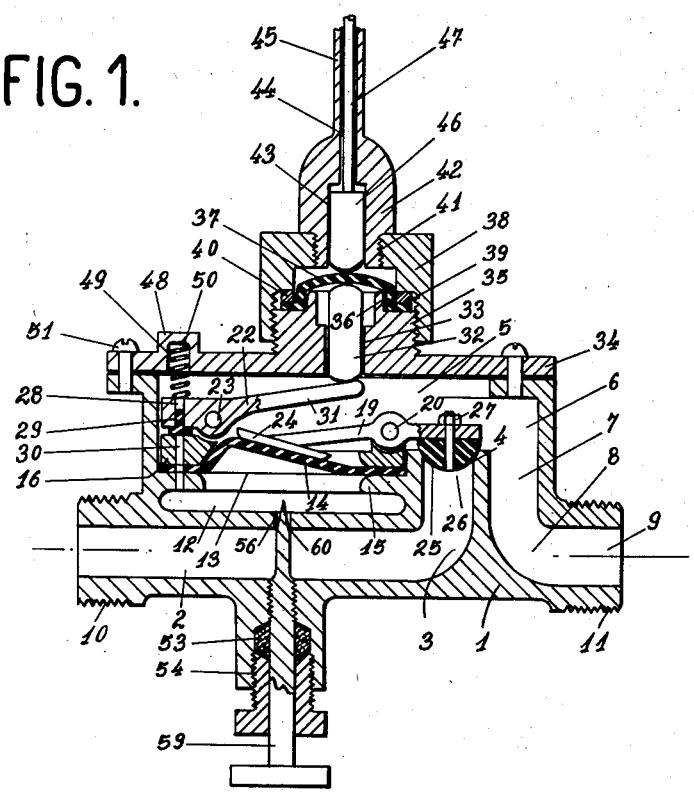
Fig. 1 is a longitudinal sectional view of the valve shown ready for use.
Figure 2:
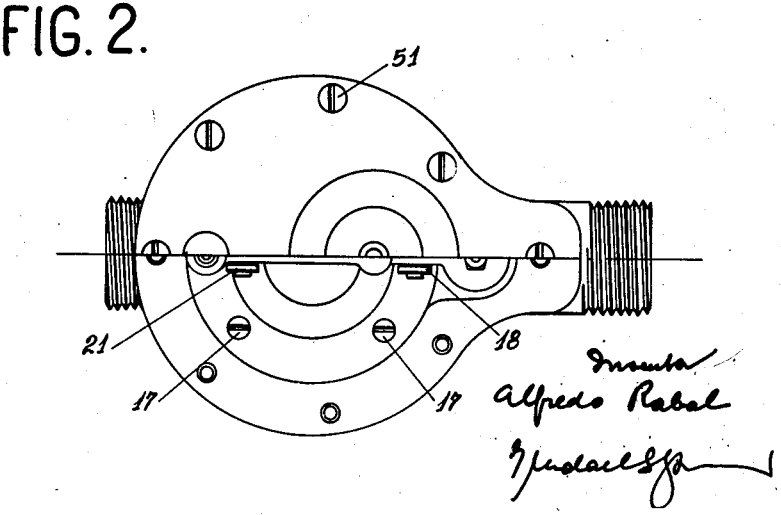
Fig. 2 is a plan view of the device.

Referring now to the drawings, 1 is a casing of a special shape provided with a fluid supply passage 2 which bends at 3 and leads to a chamber 5, which is connected at 6 with another tubular passage 7 which bends at 8 and has an outlet 9.

The threaded portion 10 is the coupling for the supply pipe and the opposite part 11 is the coupling for the drain pipe. The valve casing 1 has in its middle portion a first pressure chamber 12 with a wide opening 13 closed by the rubber membrane, or flexible circular diaphragm 14 whose edges are held to the flange 15 by means of ring 16 having screws 17. The ring 16 has a fork-shaped extension 18 where lever 19 is rockably mounted on bolt 20.

Ring 16 has diametrically opposed to extension 18 a fork shaped extension 21, a little displaced to the central part where lever 22 balances on bolt 23.

Lever 19 is provided on its power arm with an inclined flat disk portion 24, whose surface bears on diaphragm 14.

At the resistance arm of lever 19 a rubber semisphere 25 is arranged, held by screw 26 and nut 27.

Lever 22 has in its resistance arm a hole 28 where the rubber knob 29 is mounted which is used to close hole 30 in ring 16. The hole 30 is extended through diaphragm 14 and the inner flange 15 and connects the pressure chamber 12 with chamber 5.

The end 31 of lever 22 bears against the cylindrical part 32 which moves freely in hole 33 of lid 34, which has in its upper middle portion a threaded projection 35 and an annular projection 36 closed by a rubber cap 37.

38 is a nut threaded at 35 which by means of recessed portion 39 presses the washer 40 against the edge of cap 37. Nut 38 has in its central part a threaded hole 41 into which part 42 is screwed which has a hole 43 and an extension 44 of this hole of smaller diameter.

45 is a flexible pipe connected with part 42.

In hole 43 a piston 46 moves axially and carries the flexible rod 47 which moves freely within pipe 45. 48 is a projecting portion of lid 34 with a recess 49 where spring 50 is housed which abuts with its lower end on the resistance arm of lever 22. 51 are the screws that hold the lid 34 against chest 1.

The lower portion of casing 1 has a projecting portion with a hole in its central part 53 threaded at 54 and another threaded coaxial hole of smaller diameter. 56 is a hole that connects pipe 2 with pressure chamber 12. A nut threaded at 54 is provided with a hole in its central portion through which a threaded needle valve rod 59 passes and extends through pipe 2 and checks at 60 the water passage from pipe 2 to the pressure chamber 12. The packing in the central part 53 is compressed by said nut.

In the form of Figs. 3 and 4, the valve operating lever 62 has a float 65 fastened on the reduced portion 63 by means of a nut 66 and threads 64.

In Figs. 5 and 6, a rubber ring 67 engages with its outer perimeter recess 68 of part 1, and with its inner perimeter the outer surface of feed pipe 69 so as to prevent leaks.

The end of feed pipe 69 projects into recess 70 of part 1 to keep the device in a horizontal position.

71 is a tubular part that connects tube 2 with pressure chamber 12 by means of holes 72 and 73.

The tubular part 71 has projections 74 and 75 and it is fixed on projections 76 of part 1 and on the part 77 which forms the pressure chamber 12, by means of screws and bolts.

Operation

In the arrangement of Fig. 1 to be used instead of the usual faucets, the valve is shown in closing condition. In said position spring 50 presses the rubber knob 29 against hole 30 keeping it closed. The water that passes from tube 2 to pressure chamber 12 through hole 56 regulated by point 60 presses on diaphragm 14 and through this on disc 24, thus it operates lever 19 and presses the rubber semisphere 25 against seat 4 closing it.

When by any means the flexible rod 47 is being displaced toward the inner part of the valve, the piston 46 transmits its displacement to the cylindrical part 36 through the rubber cap 37 whose part 32 operates lever 22 compressing spring 50 and separating the rubber knob 29 from hole 30. The water in pressure chamber 12 passes to chamber 5 through hole 30 in greater quantity than it is replaced through regulated hole 56 and pressure in chamber 12 is considerably reduced, while the pressure fluid in the passage 2, being already free from counter-pressure of chamber 12, lifts the rubber semi-sphere 25 from seat 4, passes to chamber 5 and together with the discharge from hole 30 passes into passage 7 and through mouth 9 to the drain pipe.

When the operation of the flexible rod 47 ceases, spring 50 reacts closing hole 30. The water passing through the regulated hole 56 accumulates in chamber 12 and pressing on disc 24 through diaphragm 14 operates lever 19, thereby pressing the rubber semi-sphere 25 against mouth 4 and closing the valve owing to the difference of effective surfaces between diaphragm 14 and valve 25.

In the arrangement of the valve in Figures 3, 4, 5 and 6 lever 62 is operated by float 65, which responds to the level of liquid in a container into which the passage 2 empties.

It is understood that in carrying out this invention, the most suitable materials may be used, and that slight constructive alterations may be made which would fall within the scope of this invention.

I claim:

1. In an automatic by-pass valve comprising a valve casing having a valve chamber and a flexible diaphragm closing the latter, the combination of a fluid supply passage in the valve casing terminating in a valve seat at one end and connectible at the other end to a fluid supply; a lever disposed exteriorly of the valve chamber and pivoted intermediate the ends thereof to the valve casing with one end forming a valve closure cooperating with the valve seat and at the other end terminating in a portion bearing on the diaphragm; the valve casing having a first passage leading from the fluid supply passage into said valve chamber; said valve casing having a second passage of larger capacity than said first passage leading from the interior of said valve chamber to the exterior of said diaphragm independently of said fluid supply passage; and a second lever pivoted to said valve casing and having a closure portion thereon for closing the second passage and one end remote from said closure portion movable through an arc from one position in which the closure portion on said lever closes said second passage to another position in which said closure portion is spaced away from and thus opens said second passage.

2. In an automatic by-pass valve comprising a valve casing having a first valve chamber and a flexible diaphragm closing the latter, the combination of a fluid supply passage in the valve casing terminating in a valve seat at one end and connectible at the other end to a fluid supply, the valve casing having a second valve chamber exteriorly of the diaphragm and a fluid outlet passage leading outwardly from the second valve chamber; a lever disposed within the latter valve chamber and pivoted intermediate the ends thereof to the valve casing with one end forming a valve closure cooperating with the valve seat and at the other end terminating in a portion bearing on the diaphragm; the valve casing having a first passage leading from the fluid supply passage into the first valve chamber; said valve casing having a second passage of larger capacity than said first passage leading from the interior of said first valve chamber into said second valve chamber independently of said fluid supply passage; and a second lever pivoted to said valve casing within said second valve chamber and having a closure portion thereon for closing the second passage and one end remote from said closure portion movable through an arc from one position in which the closure portion on said lever closes said second passage to another position in which said closure portion is spaced away from and thus opens said second passage.

3. In an automatic by-pass valve comprising a valve casing having a first valve chamber and a flexible diaphragm closing the latter, the combination of a fluid supply passage in the valve casing terminating in a valve seat at one end and connectible at the other end to a fluid supply, the valve casing having a second valve chamber exteriorly of the diaphragm and a fluid outlet passage leading outwardly from the second valve chamber; a lever disposed within the latter valve chamber and pivoted intermediate the ends thereof to the valve casing intermediate the valve seat and the diaphragm in the latter with one end of the lever forming a valve closure cooperating with said valve seat and the other end terminating in an inclined flat portion bearing on the diaphragm; the valve casing having a first passage leading from the fluid supply passage into the first chamber; an exteriorly accessible and independently operable needle valve having the inner end thereof cooperating with the first passage whereby to open and close the same at will; said valve casing having a second passage of larger capacity than said first passage leading from the interior of said first valve chamber into said second valve chamber independently of said fluid supply passage; and a second lever pivoted to said valve casing within said second valve chamber and having a closure portion thereon for closing the second passage and one end remote from said closure portion movable through an arc from one position in which the closure portion on said lever closes said second passage to another position in which said closure portion is spaced away from and thus opens said second passage.

References Cited in the file of this patent

UNITED STATES PATENTS

| Number | Name | Date |
|---|---|---|
| 408,687 | Brandly | Aug. 13, 1889 |
| 453,997 | Folger et al. | June 9, 1891 |
| 595,061 | Gulland | Dec. 7, 1897 |
| 917,443 | John | Apr. 6, 1909 |
| 925,538 | Weaver | June 22, 1909 |
| 2,338,760 | Deming | Jan. 11, 1944 |
| 2,461,615 | Taylor | Feb. 15, 1949 |